United States Patent [19]

Abolins et al.

[11] 4,024,093

[45] May 17, 1977

[54] FLAME RETARDANT POLYPHENYLENE ETHER RESIN COMPOSITIONS CONTAINING A HALOGENATED FLAME RETARDANT AND SELECTED ORGANIC IRON SALTS

[75] Inventors: Visvaldis Abolins, Delmar; Fred F. Holub, Schenectady, both of N.Y.

[73] Assignee: General Electric Company, Pittsfield, Mass.

[22] Filed: Jan. 23, 1975

[21] Appl. No.: 543,280

[52] U.S. Cl. .................. 260/17.4 SG; 260/235; 260/45.75 P; 260/874
[51] Int. Cl.² .................. C08L 5/00; C08L 25/09; C08K 5/09
[58] Field of Search ...... 260/874, 23.7 M, 45.75 P, 260/45.95, 17.4 SG, 23 S

[56] References Cited

UNITED STATES PATENTS

| | | | |
|---|---|---|---|
| 2,759,904 | 8/1956 | Talcott | 260/45.75 P |
| 3,595,815 | 7/1971 | Willersinn et al. | 260/45.75 P |
| 3,639,506 | 2/1972 | Haaf | 260/874 |
| 3,951,894 | 4/1976 | Whelan | 260/27 BB |

*Primary Examiner*—Murray Tillman
*Assistant Examiner*—Thurman K. Page

*Attorney, Agent, or Firm*—William F. Mufatti; Edward A. Hedman

[57] ABSTRACT

Novel flame retardant polyphenylene ether resin compositions are disclosed which include, as a combination of flame retardants, a halogenated flame retardant and an organic iron compound wherein the organic group is derived from a compound of the formula:

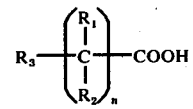

wherein $R_1$ is selected from the group consisting of hydrogen, hydroxyl and lower alkylene carboxy wherein the alkylene moiety has from 1–4 carbon atoms; $R_2$ is selected from the group consisting of hydrogen, hydroxyl and lower alkyl of 1–4 carbon atoms; $R_3$ is selected from the group consisting of hydrogen, lower alkyl of 1–4 carbon atoms, hydroxyl, lower alkylene carboxy, aryl, aralkyl, alkaryl, lower alkylidene carboxy wherein the alkylidene moiety has from 1–4 carbon atoms and $n$ is a whole number of from 1 to 20 with the proviso that no compound has more than six hydroxy groups.

25 Claims, No Drawings

FLAME RETARDANT POLYPHENYLENE ETHER RESIN COMPOSITIONS CONTAINING A HALOGENATED FLAME RETARDANT AND SELECTED ORGANIC IRON SALTS

This invention relates to flame retardant polyphenylene ether resin compositions that include as a combination of flame retardants, a halogenated flame retardant and a organic iron compound wherein the organic group is derived from a compound of the formula:

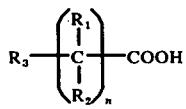

wherein $R_1$ is selected from the group consisting of hydrogen, hydroxyl and lower alkylene carboxy wherein the alkylene moiety has from 1–4 carbon atoms; $R_2$ is selected from the group consisting of hydrogen, hydroxyl and lower alkyl of 1–4 carbon atoms; $R_3$ is selected from the group consisting of hydrogen, lower alkyl of 1–4 carbon atoms, hydroxyl, lower alkylene carboxy, aryl, aralkyl, arkaryl, lower alkylidene carboxy wherein the alkylidene moiety has from 1–4 carbon atoms and $n$ is a whole number of from 1 to 20 with the proviso that no compound has more than six hydroxy groups.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. No. 3,306,874 and 3,306,875, and in Stamatoff, U.S. Pat. No. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al. U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. Cizek, U.S. Pat. No. 3,383,435 discloses polyphenylene ether-styrene resin compositions. All of the above-mentioned disclosures are incorporated herein by reference.

Flame retardant polyphenylene oxide compositions are known in the prior art. These compositions have usually relied on halogenated compounds and antimony compounds to achieve flame retardancy. The use of this type of a flame retardant system results in compositions that have decreased impact resistance.

It has now been found that normally flammable polyphenylene ether resin compositions are rendered flame retardant with a combination of a halogenated flame retardant compound and a particular ion compound.

The polyphenylene ether resin compositions are only rendered flame retardant by the use of a halogenated flame retardant in combination with the particular iron compound as either compound when used alone will not render polyphenylene ether resin compositions flame retardant.

The primary object of this invention is to provide novel polyphenylene oxide resin compositions that have flame retardant properties.

It is a further object of this invention to provide novel phenylene oxide resin compositions that have flame retardant properties and have good impact strength.

DESCRIPTION OF THE INVENTION

The above mentioned objects of the invention are secured by a composition that comprises:
a. a polyphenylene ether resin;
b. a vinyl aromatic resin
c. a flame retardant amount of a flame retardant halogenated compound or compounds; and
d. a minor amount of an organic iron compound wherein the organic group is derived from a compound of the formula:

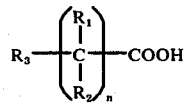

wherein $R_1$ is selected from the group consisting of hydrogen, hydroxyl and lower alkylene carboxy wherein the alkylene moiety has from 1–4 carbon atoms; $R_2$ is selected from the group consisting of hydrogen, hydroxyl and lower alkyl of 1–4 carbon atoms; $R_3$ is selected from the group consisting of hydrogen, lower alkyl of 1–4 carbon atoms, hydroxyl, lower alkylene carboxy, aryl, aralkyl, alkaryl, lower alkylidene carboxy wherein the alkylidene moiety has from 1–4 carbon atoms and $n$ is a whole number of from 1 to 20 with the proviso that no compound has more than six hydroxy groups.

The useful iron compounds include but are not limited to ferric acetate, ferric citrate, ferrous gluconate and ferric stearate. Generally, it is preferred to employ ferric salts of organic acids having from 2–23 carbon atoms. In particular, iron salts of alkanoic acids having 2–20 carbon atoms, the iron salts of hydroxy substituted alkanoic acids and the iron salts of hydroxy substituted tricarboxylic acids are preferred.

As used herein, the term lower alkyl of 1–4 carbon atoms includes methyl, ethyl, propyl, butyl and isomers thereof. The term aralkyl includes aromatic groups linked to alkyl groups having 1–4 carbon atoms such as phenethyl, phenpropyl and the like.

The polyphenylene ether resins are preferably of the type having the repeated structural formula:

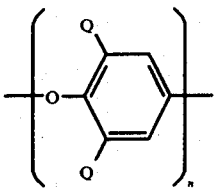

wherein the oxygen ether atom of one unit is connected to the benzene nucleus of the next adjoining unit, n is a positive integer and is at least 50, and each Q is monovalent substituent selected from the group consisting of hydrogen, halogen, hydrocarbon radicals free of a tertiary alpha carbon atom, halohydrocarbon radicals having at least two carbon atoms between the halogen atom and the phenyl nucleus, hydrocarbonoxy radicals and halohydrocarbonoxy radicals having at least two carbon atoms.

The vinyl aromatic resins are preferably of the type wherein at least 25% of the units of said vinyl aromatic resin are of the formula:

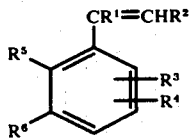

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ may be concatenated together with hydrocarbyl groups to form a naphthyl group.

Materials that may be copolymerized with the units of the vinyl aromatic monomer include those having the general formula:

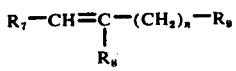

wherein $R_8$ and $R_7$ represent a substituent selected from the group consisting of hydrogen, halogen, an alkyl group of 1–4 carbon atoms, carboalkoxy or $R_7$ and $R_8$ taken together represent an anhydride linkage (—COOOC—) and $R_9$ is hydrogen, vinyl, an alkyl or alkenyl group having 1 to 12 carbon atoms, cycloalkyl, carboalkoxy, alkoxy-alkyl, alkyl carboxy, ketoxy, halogen, carboxy, cyano or pyridyl and n is a whole number between 0 and 9.

The general formula set forth includes by way of example, homopolymers such as polystyrene and monochloropolystyrene, the modified polystyrenes, such as rubber-modified, high-impact polystyrene and the styrene containing copolymers, such as the styrene acrylonitrile copolymers, styrene butadiene copolymers, styrene-acrylonitrile- -alkyl styrene copolymers, styrene-acrylonitrile-butadiene copolymers, poly---methylstyrene, copolymers of ethylvinylbenzene, and divinylbenzene; styrene-maleic anhydride copolymers; styrene-butadiene-styrene block copolymers and styrene-butadiene block copolymers; and styrene-butadiene-styrene maleic anhydride block copolymers.

The preferred vinyl aromatic resins are the halogen-free vinyl aromatic resins.

The compositions of the invention may comprise from 10 to 90 parts by weight of polyphenylene either and from 90 to 10 parts by weight of styrene resin, blended and/or grafted. Preferred compositions will comprise from 20–50 parts by weight of polyphenylene ether resin and 50–80 parts by weight of styrene resin.

The choice of a halogenated flame-retardant compound is not critical although certain materials may perform better than others. Thermally stable bromine compounds are sometimes preferred as they resist discoloration at the higher compounding temperatures.

Among the useful halongen-containing compounds are those of the formula:

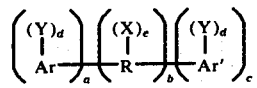

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; a sulfur-containing linkage, e.g., sulfide, sulfoxide, sulfone, carbonate; a phosphorus-containing linkage; and the like. R can also consist of two or more alkylene or alkylidene linkages connected by such groups as aromatic, ether, ester, carbonyl, sulfide, sulfoxide, sulfone, a phosphorus-containing linkage, and the like. R can be a dihydric phenol, e.g., bisphenol-A, carbonate linkage. Other groups which are represented by R will occur to those skilled in the art.

Ar and Ar' are mono- or polycarboxyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula, OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter $d$ represents a whole number ranging from 1 to a maximum equivalent to the number of replaceable hydrogens substituted on the aromatic rings comprising Ar or Ar'. The letter $e$ represents a whole number ranging from 0 to $a$ maximum controlled by the number of replaceable hydrogens on R. The letters $a$, $b$, and c represent whole numbers including 0. When b is not 0, neither a nor c may be 0. Where b is 0, the aromatic groups are joined by a direct carbon-to-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are diaromatics of which the following are representative:

2,2-bis(3,5-dichlorophenyl)propane
bis(2-chlorophenyl)methane
bis(2,6-dibromophenyl)methane
1,1-bis(4-iodophenyl)ethane
1,2-bis(2,6-dichlorophenyl)ethane
1,1-bis(2-chloro-4-iodophenyl)ethane
1,1-bis(2-chloro-4-methylphenyl)ethane
1,1-bis(3,5-dichlorophenyl)ethane
2,2-bis(3-phenyl-4-bromophenyl)ethane
2,3-bis-4,6-dichloronaphthyl) propane
2,2-bis(2,6-dichlorophenyl)pentane
2,2-bis(3,5-dichlorophenyl)hexane
bis(4-chlorophenyl)phenylmethane
bis(3,5-dichlorophenyl)cyclohexylmethane
bis(3-nitro-4-bromophenyl)methane
bis(4-hydroxy-2,6-dichloro-3-methoxyphenyl)methane
2,2-bis(3,5-dichloro-4-hydroxyphenyl)propane
2,2-bis(3-bromo-4-hydroxyphenyl)propane The preparation of these and other applicable biphenyls are known in the art. In place of the divalent aliphatic group in the above examples may be substituted sulfide, sulfoxy and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkenyl group and having at least two chlorine or bromine atoms per phenyl radical such as chlorinated diphenyl ether and brominated diphenyl ether, monochloropolystyrene, bromine containing aromatic polycarbonates, chlorine containing aromatic polycarbonates, and mixtures of at least two of the foregoing.

Aromatic carbonate homopolymers having repeating units of the formula:

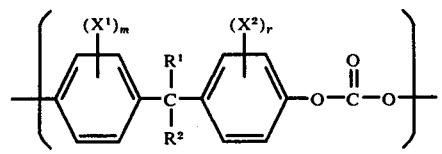

wherein $R^1$ and $R^2$ are hydrogen, (lower)alkyl or phenyl, $X^1$ and $X^2$ are bromo or chloro and $m$ and $r$ are from 1 to 4. These materials may be prepared by techniques well known to those skilled in the art.

Also aromatic carbonate copolymers in which from 25 to 75 wt. percent of the repeating units comprise and are synthesized from chloro- or bromo-substituted dihydric phenol units. These aromatic carbonate copolymers can be prepared by procedures set forth in U.S. Pat. No. 3,334,154 which is incorporated by reference.

The amount of the particular halogenated flame retardant compound employed may vary in accordance with the total amount of halogen in the particular halogenated compound and the amount of polyphenylene ether resin. Generally the flame retardant compositions will contain a flame retardant amount of the halogenated material that is sufficient to provide with the iron organo compound, a flame retardant composition. Preferred compositions may vary from 10 to 30 parts by weight of the halogenated flame retardant compound or compounds. Those skilled in the art will appreciate the fact that mixtures of halogenated flame retardants may be used and that higher quantities of the various halogenated compounds will be required to achieve higher degrees of flame retardancy. Many compositions according to the invention are sufficiently flame retardant to pass standard flammability tests such as UL Standard 94 vertical burning test for classifying materials 94V0, 94 V1 94 V2. Only a minor amount of the particular iron compound sufficient to render the composition flame retardant, when used in combination with the halogenated flame retardant, is to be used in the compositions of the invention. This amount may be between 0.1 to 2.5 parts by weight or more preferably between 0.3 and 1.0 parts by weight of composition.

The compositions of the invention may also include reinforcing fillers, such as aluminum, iron or nickel, and the like and non-metals, such as carbon filaments, silicates, such as acicular calcium silicate, asbestos, titanium dioxide, potassium titanate and titanate whiskers, glass flakes and fibers. It is also to be understood that, unless the filler adds to the strength and stiffness of the composition, it is only a filler and not a reinforcing filler, as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as E glass. However, other glasses are useful where electrical properties are not so important, e.g., the low soda glass known as C glass. The filaments are made by standard processes, e.g., by steam or air blowing, flame blowing and mechanical pulling. The preferred filaments for plastics reinforcement are made by mechanical pulling. The filament diameters range from about 0.0003 and 0.0009 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrates can then be custom blended with blends of resins that are not glass reinforced to provide any desired glass content of a lower value.

The length of glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛ to about 1 inch long, preferably less than one-fourth inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (⅛ inch).

The compositions of the invention may be prepared by blending the components in a Henschel mixer and thereafter compounding the mixture on a twin-screw 28 mm Werner-Pfleiderer extruder. Thereafter, the extrudate is chopped into pellets and molded on a Newbury injection molding machine.

DESCRIPTION OF THE PREFERRED EMBODIMENTS

The following examples illustrate the invention. They are set forth as a further description, but are not to be construed as limiting the invention thereto.

EXAMPLES 1–9

Blends of 35 parts by weight of poly(2,6-dimethyl-1,4-phenylene) ether resin, having an intrinsic viscosity of about 0.5 deciliters per gram as measured in chloroform at 30° C, 65 parts by weight of rubber-modified, high-impact polystyrene containing about 9% polybutadiene rubber, an iron compound and hexabromobiphenyl were prepared and tested according to ASTM procedures to evaluate physical properties. UL Standard 94 was used to evaluate flame retardancy.

The results are reported in Table 1.

TABLE 1

| Example | Hexabromo-biphenyl (phr) | Iron Additive (phr) | | Izod Impact (ft. lb./in.n) |
|---|---|---|---|---|
| 1* | 15.2 | none | | 3.2 |
| 2* | 15.2 | Ferrous oxalate | 0.5 | 3.7 |
| 3 | 15.2 | Ferric acetate | 0.5 | 4.5 |
| 4 | 15.2 | Ferric citrate | 0.5 | 4.0 |
| 5 | 15.2 | Ferrous gluconate | 0.5 | 5.0 |
| 6 | 15.2 | Ferric stearate | 0.5 | 5.3 |
| 7* | 15.2 | Ferric pyro-phosphate | 0.5 | 3.9 |
| 8* | 15.2 | Ferric glycero-phosphate | 0.5 | 3.7 |

| Example | HDT °F | Ul 94-V (1/16" samples) | Color |
|---|---|---|---|
| 1* | 212 | FAILS | Natural |
| 2* | 212 | FAILS | Natural |
| 3 | 212 | V-1 (10.7) | Gray |
| 4 | 217 | V-1 (13.2) | Light Gray |
| 5 | 218 | V-1 (11.8) | Dark Gray |
| 6 | 212 | V-1 (9.6) | Dark |
| 7 | 205 | FAILS | Dark Natural |
| 8 | 202 | FAILS | Natural |

*control
**All of the examples in this application contained 1.5 phr of polyethylene. Values in parenthesis indicate average burning time.

Control Examples 2, 7 and 8 show that certain iron compounds, not included in the claims of the present invention, do not impart flame retardancy to polyphenylene ether resin compositions.

EXAMPLES 9–20

Compositions were prepared that contained the same polyphenylene ether resin and the same vinyl aromatic resin employed in Examples 1–8 in the same proportions but having different flame retardants. The physical properties and results of UL-94 flammability tests are reported in Table 2.

TABLE 2

| Example | Halogen Source (phr) | | Iron Additive (phr) | |
|---|---|---|---|---|
| 9* | polychlorostyrene | 30 | none | |
| 10 | polychlorostyrene | 30 | Ferric stearate | 0.5 |
| 11* | decabromodiphenyl oxide | 15.2 | none | |
| 12 | decabromodiphenyl oxide | 15.2 | Ferric stearate | 0.5 |
| 13* | TBBPA-BPA** | 30.0 | none | |
| 14 | TBBPA-BPA** | 30 | Ferric stearate | 0.5 |
| 15* | chlorinated triphenyl | 15.2 | none | |
| 16 | chlorinated triphenyl | 15.2 | Ferric stearate | 0.5 |
| 17* | polychlorostyrene hexachlorobiphenyl | 30 7 | none | |
| 18 | polychlorostyrene hexachlorobiphenyl | 30 7 | Ferric stearate | 0.5 |
| 19* | chlorinated triphenyl decabromodiphenyl oxide | 7 7 | none | |
| 20 | chlorinated triphenyl decabromodiphenyl oxide | 7 7 | Ferric stearate | 0.5 |

| Example | Izod Impact (ft. lb./in.n) | HDT °F | UL 94-V (1/16" samples) | Color |
|---|---|---|---|---|
| 9* | 2.3 | 240 | FAILS | Natural |
| 10 | 2.7 | 245 | V-1 (13) | Light brown |
| 11* | 4.8 | 227 | FAILS | Natural |
| 12 | 3.5 | 229 | V-O (3.3) | Dark |
| 13* | 0.7 | 236 | FAILS | Natural |
| 14 | 0.7 | 237 | V-O (5.1) | Dark |
| 15* | 4.5 | 207 | FAILS | Natural |
| 16 | 5.1 | 218 | V-2 (10.4) | Dark |
| 17* | 3.8 | 213 | FAILS | Natural |
| 18 | 5.1 | 226 | V-1 (8.7) | Dark |
| 19* | 4.4 | 210 | FAILS | Natural |
| 20 | 4.7 | 215 | V-1 (8.4) | Dark |

*control
**polycarbonate copolymer derived from tetrabromobisphenol-A and bisphenol-A having about 27% bromine

EXAMPLES 21–26

Compositions were prepared that contained the same polyphenylene ether resin and the same vinyl aromatic resin employed in Examples 1–8 in the same proportions but having different flame retardants. The physical properties and results of UL-94 flammability tests are reported in Table 3.

TABLE 3

| Example | Hexabromo-biphenyl (phr) | Ferric Stearate (phr) | Izod Impact (ft.lb/in.n) | HDT °F |
|---|---|---|---|---|
| 21 | 15.2 | 0.1 | 4.8 | — |
| 22 | 15.2 | 0.2 | 5.5 | — |
| 23 | 15.2 | 0.3 | 5.5 | 216 |
| 24 | 15.2 | 0.5 | 5.3 | 212 |

TABLE 3-continued

| | | | | |
|---|---|---|---|---|
| 25 | 15.2 | 0.7 | 5.3 | 213 |
| 26 | 15.2 | 0.9 | 4.8 | 213 |

| Example | UL 94-V (1/16" Samples) | Color |
|---|---|---|
| 21 | FAILS | Dark Natural |
| 22 | V-2 | Dark |
| 23 | V-0 (4.5) | Dark |
| 24 | V-1 (9.6) | Dark |
| 25 | V-O (5.0) | Dark Brown |
| 26 | V-1 (13.0) | Dark Brown |

EXAMPLES 27–30

Compositions were prepared that contained the same polyphenylene ether resin and the same vinyl aromatic resin employed in Examples 1–8 in the same proportions but having different flame retardants. The physical properties and results of UL-94 flammability tests are reported in Table 4.

TABLE 4

| Example | Additive (phr) | | Ferric Stearate (phr) |
|---|---|---|---|
| 27* | triphenylphosphate | 7 | none |
| 28 | triphenylphosphate | 7 | |
| | decabromodiphenyloxide | 2 | 0.5 |
| 29 | triphenylphosphate | 7 | |
| | decabromodiphenyloxide | 2 | |
| | tridecylphosphite | 5 | 0.5 |
| 30 | triphenylphosphate | 7 | |
| | decabromodiphenyloxide | 2 | |
| | tridecylphosphite | 1 | 0.5 |

| Example | Izod Impact (ft. lb/in.n) | UL 94-V (1/16" Samples) | Color |
|---|---|---|---|
| 27* | 6.0 | FAILS | Natural |
| 28 | 5.7 | FAILS | Dark Natural |
| 29 | 4.8 | FAILS | Dark Natural |
| 30 | 3.6 | FAILS | Dark Natural |

*Control

Obviously, other modifications and variations of the present invention are possible in the light of the above teachings. It is, therefore, to be understood that changes may be made in the particular embodiments of the invention described which are within the full intended scope of the invention as defined by the appended claims.

We claim:
1. A flame retardant thermoplastic molding composition which comprises:
   a. a polyphenylene ether resin;
   b. a vinyl aromatic resin;
   c. a flame retardant amount of an aromatic halogenated flame retardant; and
   d. a flame retardant amount of an organic iron compound in which the organic group is derived from a compound of the formula:

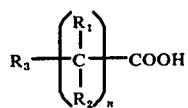

wherein $R_1$ is selected from the group consisting of hydrogen, hydroxyl and lower alkylene carboxy wherein the alkylene moiety has from 1-4 carbon atoms; $R_2$ is selected from the group consisting of hydrogen, hydroxyl and lower alkyl of 1-4 carbon atoms; $R_3$ is selected from the group consisting of hydrogen, lower alkyl of 1-4 carbon atoms, hydroxyl, lower alkylene carboxy, aryl, aralkyl, alkaryl, lower alkylidene carboxy wherein the alkylidene moiety has from 1 to 4 carbon atoms and $n$ is a whole number of from 1 to 20 with the proviso that no compound has more than six hydroxy groups.

2. A composition as defined in claim 1 wherein the aromatic halogenated flame retardant is selected from the group consisting of chlorinated benzene, brominated benzene, chlorinated biphenyl, chlorinated terphenyl, brominated biphenyl, brominated terphenyl, a compound comprising two phenyl radicals separated by a divalent alkylene or oxygen group and having at least two substituents selected from the group consisting of chlorine and bromine per phenyl radical, monochloropolystyrene, bromine containing aromatic polycarbonates, chlorine containing aromatic polycarbonates and mixtures thereof.

3. A composition as defined in claim 2 wherein said aromatic halogenated flame retardant is decabromodiphenyl oxide.

4. A composition as defined in claim 2 wherein said aromatic halogenated flame retardant is hexabromobiphenyl.

5. A composition as defined in claim 2 wherein said aromatic halogenated flame retardant is hexachlorobiphenyl.

6. A composition as defined in claim 2 wherein said aromatic halogenated flame retardant is chlorinated terphenyl.

7. A composition as defined in claim 2 wherein said aromatic halogenated flame retardant is a bromo containing polycarbonate that is an aromatic carbonate copolymer in which from 25 to 75 wt. percent of the repeating units comprise and are derived from bromo substituted dihydric phenol units and the remainder of the repeating units comprise and are derived from dihydric phenol units.

8. A composition as defined in claim 1 wherein from 10 to 30 parts by weight of the aromatic halogenated flame retardant compound is employed and from 0.1 to 2.5 parts by weight of said organic iron compound is employed.

9. A composition as defined in claim 1 wherein said polyphenylene ether has the repeating structural formula:

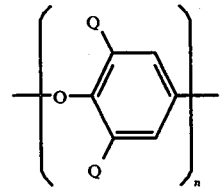

wherein the oxygen ether atom of one unit is connected to the benzene nucleus of the next adjoining unit, $n$ is a positive integer and is at least 50, and each Q is a monovalent substituent selected from the group consisting of hydrogen, halogen, hydrocarbon radicals free of a tertiary alpha carbon atoms, halohydrocarbon radicals having at least two carbon atoms between the halogen atom and the phenyl nucleus, hydrocarbonoxy radicals and halohydrocarbonoxy radicals having at least two carbon atoms.

10. A composition as defined in claim 1 wherein at least 25% of the units of said vinyl aromatic resin are of the formula:

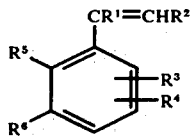

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

11. A flame retardant thermoplastic molding composition which comprises:
   a. from 10-90 parts by weight of a polyphenylene ether resin;
   b. from 90-10 parts by weight of a rubber modified high-impact polystyrene resin;
   c. from 10 to 30 parts by weight of an aromatic halogenated flame retardant compound; and
   d. from 0.1 to 2.5 parts by weight of an organic iron compound in which the organic component is derived from a group of the formula:

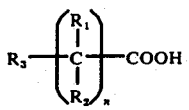

wherein $R_1$ is selected from the group consisting of hydrogen, hydroxyl and lower alkylene carboxy wherein the alkylene moiety has from 1-4 carbon atoms; $R_2$ is selected from the group consisting of hydrogen, lower alkyl of 1-4 carbon atoms and hydroxyl; $R_3$ is selected from the group consisting of hydrogen, lower alkyl of 1-4 carbon atoms, hydroxyl, lower alkylene carboxy, aryl, aralkyl, alkaryl, lower alkylidene carboxy wherein the alkylidene moiety has from 1-4 carbon atoms and $n$ is a whole number of from 1 to 20 with the proviso that no compound has more than six hydroxy groups.

12. A composition as defined in claim 11 wherein said polyphenylene ether resin is poly(2,6-dimethyl-1,4-phenylene) ether and said aromatic halogenated flame retardant is monochloropolystyrene.

13. A composition as defined in claim 11 wherein said polyphenylene ether resin is poly(2,6-dimethyl-1,4-phenylene) ether and said aromatic halogenated flame retardant is bromo containing polycarbonate that is an aromatic carbonate copolymer in which from 25 to 75 wt. percent of the repeating units comprise and are derived from bromo substituted dihydric phenol units and the remainder of the repeating units comprise and are derived from dihydric phenol units.

14. A composition as defined in claim 11 wherein said polyphenylene ether resin is poly(2,6-dimethyl-1,4-phenylene) ether and said aromatic halogenated flame retardant is a bromo containing polycarbonate that is an aromatic carbonate homopolymer in which the repeating units comprise and are derived from bromo substituted dihydric phenol units.

15. A composition as defined in claim 11 wherein the organic iron compound is ferric acetate.

16. A composition as defined in claim 11 wherein the organic iron compound is ferric stearate.

17. A composition as defined in claim 11 wherein the organic iron compound is ferric citrate.

18. A composition as defined in claim 11 wherein the organic iron compound is ferrous gluconate.

19. A flame retardant thermoplastic molding composition which comprises:
   a. from 10-90 parts by weight of poly(2,6-dimethyl-1,4-phenylene)ether.
   b. from 10-90 parts by weight of a rubber modified high impact polystyrene resin;
   c. from 10-30 parts by weight of an aromatic halogenated flame retardant agent;
   d. from 0.1 to 2.5 parts by weight of an organic iron compound selected from the group consisting of the iron salts of alkanoic acids having from 2-20 carbon atoms, the iron salts of hydroxy substituted alkanoic acids and the iron salts of hydroxy substituted tricarboxylic acids.

20. A composition as defined in claim 19 wherein the organic iron compound is ferric acetate.

21. A composition as defined in claim 19 wherein the organic iron compound is ferric stearate.

22. A composition as defined in claim 19 wherein the organic iron compound is ferrous gulconate.

23. A composition as defined in claim 19 wherein the organic iron compound is ferric citrate.

24. A flame retardant thermoplastic molding composition which consists essentially of:
   a. a polyphenylene ether resin;
   b. a vinyl aromatic resin;
   c. a flame retardant amount of an aromatic brominated flame retardant; and
   d. a flame retardant amount of an organic iron compound in which the organic group is derived from a compound of the formula:

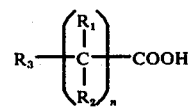

wherein $R_1$ is selected from the group consisting of hydrogen, hydroxyl and lower alkylene carboxy wherein the alkylene moiety has from 1-4 carbon atoms; $R_2$ is selected from the group consisting of hydrogen, hydroxyl and lower alkyl of 1-4 carbon atoms; $R_3$ is selected from the group consisting of hydrogen, lower alkyl of 1-4 carbon atoms, hydroxyl, lower alkylene carboxy, aryl, aralkyl, alkaryl, lower alkylidene carboxy wherein the alkylidene mmoiety has from 1 to 4 carbon atoms and $n$ is a whole number of from 1 to 20 with the proviso that no compound has more than six hydroxy groups.

25. A composition as defined in claim 1 wherein the aromatic halogenated flame retardant is a thermally stable bromine compound.

* * * * *

UNITED STATES PATENT OFFICE
CERTIFICATE OF CORRECTION

Patent No. 4,024,093    Dated May 17, 1977

Inventor(s) Visvaldis Abolins et al.

It is certified that error appears in the above-identified patent and that said Letters Patent are hereby corrected as shown below:

Col. 2, line 12 "ion" should be --iron--

Col. 3, line 64, after "-acrylonitrile-" and before "-alkyl", insert -- $\alpha$ --

Col. 3, line 66, before "-methylstyrene" insert -- $\alpha$ --

Col. 4, line 6, "either" should be --ether--

Col. 4, line 16, "halongen" should be --halogen--

Col. 5, line 40, "dibromobiphen;1" should be --dibromobiphenyl--

UNITED STATES PATENT OFFICE
CERTIFICATE OF CORRECTION

Patent No. 4,024,093          Dated May 17, 1977

Inventor(s) Visvaldis Abolins et al.

It is certified that error appears in the above-identified patent and that said Letters Patent are hereby corrected as shown below:

Col. 6, line 28, after "94 V1," and before "94 V0"

insert --or--

Claim 24, line 59, "mmoiety" should be --moiety--

Signed and Sealed this thirtieth Day of August 1977

[SEAL]

Attest:

RUTH C. MASON
Attesting Officer

C. MARSHALL DANN
Commissioner of Patents and Trademarks